(12) United States Patent
Das et al.

(10) Patent No.: US 8,108,728 B2
(45) Date of Patent: Jan. 31, 2012

(54) METHOD AND APPARATUS FOR OPERATIONAL-LEVEL FUNCTIONAL AND DEGRADATION FAULT ANALYSIS

(75) Inventors: Dipankar Das, Pune (IN); Partha P. Chakrabarti, Kharagpur (IN); Purnendu Sinha, Karnataka (IN)

(73) Assignees: GM Global Technology Operations LLC, Detroit, MI (US); Indian Institute of Technology Kharagpur, West Bengal (IN)

( * ) Notice: Subject to any disclaimer, the term of this patent is extended or adjusted under 35 U.S.C. 154(b) by 27 days.

(21) Appl. No.: 12/753,166

(22) Filed: Apr. 2, 2010

(65) Prior Publication Data

US 2011/0246831 A1 Oct. 6, 2011

(51) Int. Cl.
*G06F 11/00* (2006.01)
(52) U.S. Cl. .......................................................... 714/29
(58) Field of Classification Search ....................... 714/29
See application file for complete search history.

(56) References Cited

U.S. PATENT DOCUMENTS

| | | | |
|---|---|---|---|
| 6,691,250 B1* | 2/2004 | Chandiramani et al. | 714/25 |
| 7,000,141 B1* | 2/2006 | Karlsson et al. | 714/4.5 |
| 7,113,902 B2 | 9/2006 | Swoboda | |
| 7,260,501 B2 | 8/2007 | Pattipatti et al. | |
| 7,356,786 B2 | 4/2008 | Schubert et al. | |
| 7,379,846 B1 | 5/2008 | Williams et al. | |
| 7,506,286 B2 | 3/2009 | Beardslee et al. | |
| 7,516,025 B1 | 4/2009 | Williams et al. | |
| 7,558,999 B2 | 7/2009 | Adkisson et al. | |
| 2004/0030974 A1* | 2/2004 | Ashar et al. | 714/724 |
| 2005/0102594 A1 | 5/2005 | Dey et al. | |
| 2006/0259286 A1 | 11/2006 | Sofer | |
| 2008/0140379 A1 | 6/2008 | Shah et al. | |
| 2008/0285184 A1 | 11/2008 | Phadke et al. | |
| 2009/0271170 A1* | 10/2009 | De Barros et al. | 703/21 |

OTHER PUBLICATIONS

Anonymous; Abstract RD316017A; Creating stuck-at faults in a logic simulator adding function to lock-up (sic; look-up) table to generate fixed outputs simulating intermittent faults; Aug. 10, 1990.

* cited by examiner

*Primary Examiner* — Amine Riad
(74) *Attorney, Agent, or Firm* — Quinn Law Group, PLLC (57) ABSTRACT

An apparatus and method are provided for analyzing fault tolerance of a system, and performing "what if?" analysis for various fault-tolerant system design options. The fault tolerance analysis approach handles logical failures and quality faults emanating from loss of precision in signal values. The method can detect quality faults, which can allow systems to be built which are resilient to precision losses. Two analysis steps are provided, one static and another simulation-based, which are used in tandem to check the fault tolerance of an automotive or other system. While a simulation-based method checks fault-resilience under specific test cases and fault-scenarios, the static analysis method quickly checks all test cases and fault-scenarios. The static analysis method makes approximations while performing the analysis, and any fault detected is reproduced using the simulation-based method. All analysis operations are performed on operations-level behavioral models of the applications, thereby reducing the cost of analysis.

17 Claims, 5 Drawing Sheets

Fig-1

(a) Non-faulty signal

*Fig-2A*

(b) Shift in trajectory

*Fig-2B*

(c) Noise on trajectory

*Fig-2C*

(d) Spikes on trajectory

*Fig-2D*

(e) Delay error leading to shift

*Fig-2E*

(f) Timing mismatch due to delay error

METHOD AND APPARATUS FOR OPERATIONAL-LEVEL FUNCTIONAL AND DEGRADATION FAULT ANALYSIS

TECHNICAL FIELD

The present invention relates to a method and an apparatus for providing fault tolerance analysis in an automotive or other complex system.

BACKGROUND OF THE INVENTION

With the proliferation of electronics and software as building blocks within automotive and other relatively complex systems, fault tolerance has emerged as a fundamental design requirement. Therefore, it is desirable to develop systems that preserve their functionality in spite of errors in system-level electronics, communications, and/or processing components. Failure of certain electronic components may cause system-level behavior changes. For example, relative to a defective mechanical steering column, a stuck-at-fault condition in a microprocessor adapted for providing electrical signals in a steer-by-wire vehicle system can cause a relatively high variation in output steering torque. Additionally, automotive systems must conform to stringent industry requirements, including specific fault tolerance requirements.

Failure of electrical components in a system may occur due to component defects and age-related degradation. Chips, sensors, power supplies, and electromechanical actuators can fail permanently or transiently, or simply by becoming progressively less precise over time. Additionally, hardware and software bugs can cause transient and permanent failures, which can manifest themselves as errors in the output of a system-level controller, and ultimately in the function of any actuators disposed within the system. Components such as sensors, software blocks, and hardware blocks can introduce sporadic quality faults ranging from a shift in signal trajectory to erroneous transient outputs, which can lead to loss of signal precision.

SUMMARY OF THE INVENTION

Accordingly, a computer or host machine-based method and apparatus are provided herein that enable fault tolerance (FT) analysis in an automotive system or other relatively complex system, doing so at the early stages of design, e.g., at the operational level of analysis and/or the design/modeling stages. An integrated framework provides logical as well as quality analysis, and also allows for future reliability analysis extensions. In addition to analyzing fault tolerance of an automotive system, the invention performs a "what if?" or hypothetical analysis for various fault-tolerant automotive system design options, as set forth below. Hence, the present method and apparatus can detect quality faults, which in turn can aid in the building of systems which are resilient to precision losses in both hardware and software components.

The proposed approach consists of two analysis methodologies or steps, one static and the other being simulation-based, which are used in tandem to evaluate the fault tolerance of a given system. An advantage of the present FT analysis approach is that all operations are performed via operational or operations-level behavioral models of the applications, e.g., using Simulink, MATRIXx, or other modeling software, thereby potentially reducing the cost of analysis relative to conventional methods.

In particular, a method for analyzing the FT capability of a system includes recording, on tangible media accessible by a host machine, a set of FT requirements defining a functional specification; using the host machine to generate a model of the system; automatically abstracting or characterizing the behavior of a set of components of the system, as represented in the model, as a discrete lookup table (LUT); and using the host machine to process or analyze the FT capability of the system via the discrete LUT and the functional specification. Analyzing the FT capabilities of the system includes analyzing a predetermined set of logical failures and quality faults of the system.

An apparatus is also provided herein for analyzing the FT capability of the system. The apparatus includes the host machine, which hosts tangible media and an algorithm for executing the method noted above.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
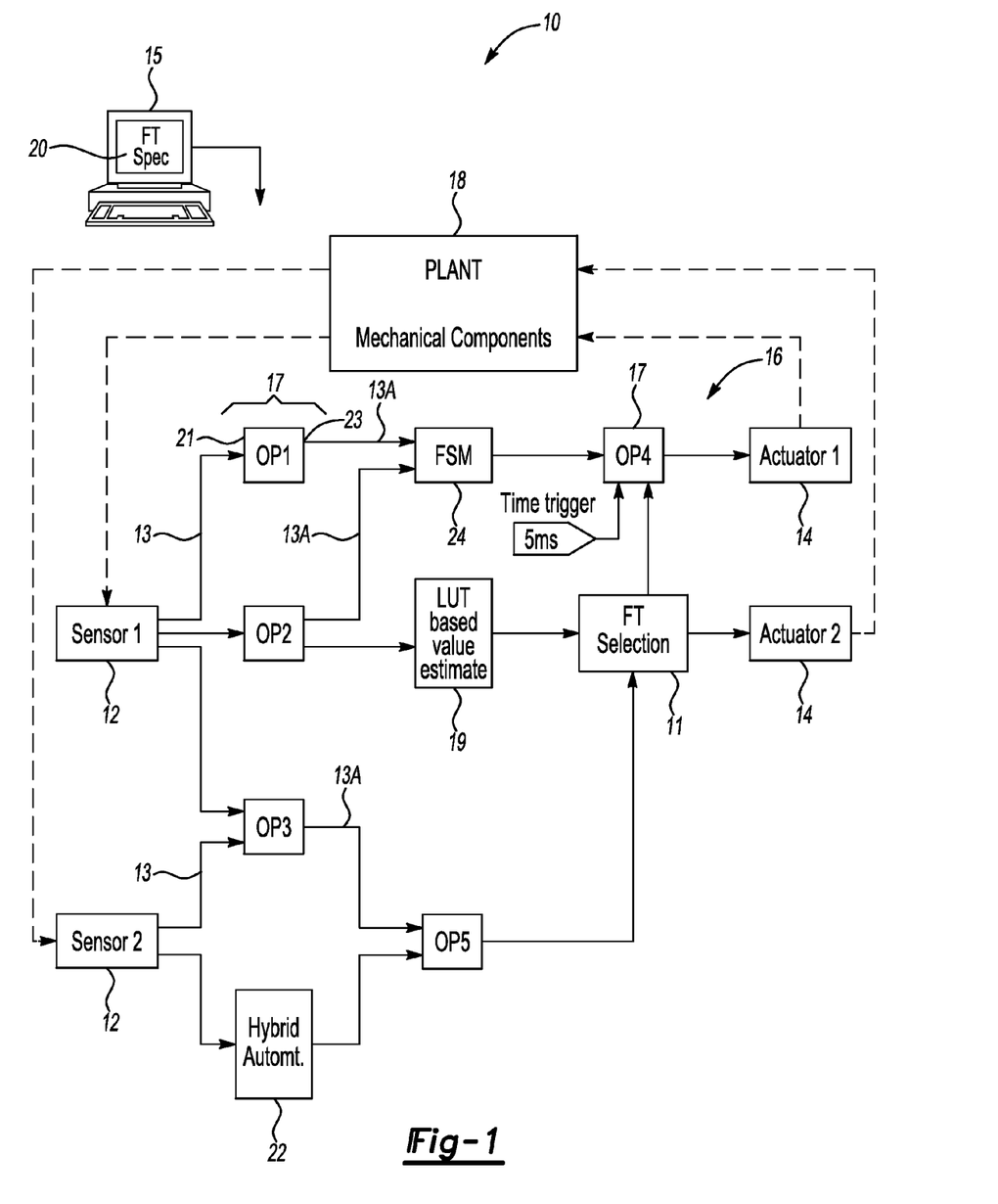
FIG. 1 is a schematic representation of an operations-level model and host machine usable for executing a fault tolerance analysis of an automotive or other system.

With reference to the drawings, wherein like reference numbers refer to the same or similar components throughout the several views, and beginning with FIG. 1, an operations-level model 10 may be generated using a host machine 15, with automated circuit analyses of the fault tolerance (FT) of a given system being executable via the host machine 15. The host machine 15 includes tangible media, on which is recorded a FT specification 20. Using the host machine 15 and the approach set forth herein, FT analysis is enabled for automotive and other complex systems.

The host machine 15 may be configured as a digital computer generally comprising a microprocessor or central processing unit, read only memory (ROM), random access memory (RAM), electrically-erasable programmable read only memory (EEPROM), a high-speed clock, analog-to-digital (A/D) and digital-to-analog (D/A) circuitry, and input/output circuitry and devices (I/O), as well as appropriate signal conditioning and buffer circuitry. Any algorithms resident in the host machine 15 or accessible thereby may be stored on a recordable media and executed by the host machine to provide the respective functionality.

Host machine 15 also provides the capability of performing a "what if?" or hypothetical design modification analysis for various system design options. As used herein, "what if?" analysis allows a designer, working with one design, to make modifications to the design hoping for an improvement in the FT of that design. In order to confirm that the modification actually worked, the designer would have to check if the FT of the system improves or reduces. The designer is therefore allowed to inquire as to what would happen if these changes were made to the design. The proposed methodology addresses this question of the designer from an FT perspective. It may be noted that there could be other tools which address the "what if" analysis from say a power consumption perspective.

The model 10 of FIG. 1 includes sensors 12, actuators 14, control logic 16 having various software operations 17, and a plant-level model 18. Operations-level modeling languages, for example Simulink, MATRIXx, etc., may be used to provide a versatile framework for modeling the various aspects and abstractions of automotive and other systems. Resultant models are capable of representing not only function-level models of the automotive system, but also some details of the architectural platform on which the automotive system is executing, e.g., mapping to a processor, buffers, buses, etc.

Control logic 16 may consist of various linked or related software operations, e.g., OP1-5 in FIG. 1. Plant model 18 may be a mathematical model of the dynamics of the various interconnected or mechanical components of a given system, e.g., a relatively complex automotive system such as a by-wire steering or braking device according to one possible embodiment, although non-automotive systems may also be analyzed within the scope of the present invention.

Model 10 consists of the operations 17, each of which have input and output ports, and of input signals 13 into input ports 21 and output signals 13A from output ports 23. Signals 13, 13A represent a virtual connection between different operations, and may correspond to physical quantities, e.g., output voltage generated by a filter, or may correspond to a data value generated by a software block.

Each operation 17 in FIG. 1 corresponds to a functional component of the particular system being diagnosed, with the functional component ranging from a sensor 12, a software code-block, and analog component, etc. Discrete-event semantics is considered herein, as several operations 17 are mapped to software components, i.e., operating on sampled signals in discrete steps. Each signal 13 denotes a value which is updated by the "source" operation in every time-slot.

FIG. 1 shows one possible model, which is broadly similar to schematic representations of several operations-level models of an automotive system. Each operation 17 in model 10 corresponds to either a task of a particular control application, a sensor operation, an actuator operation, or mechanical parts/components of the plant as represented by model 18. Each operation 17 may be represented by either a logical or arithmetic function, a state-machine like a Finite State Machine (FSM) 24, or a hybrid I/O automata 22. The model 10 uses lookup tables (LUTs) in a LUT-based value estimate block 19. FT selection block 11 selects an input, e.g., from either of OP5 and a LUT-based estimate block 19 in the embodiment of FIG. 1, and transfers the value to its output. To perform this selection, FT selection block 11 detects if one of the two inputs is faulty based on a user-defined criteria, e.g., checking if the input value falls within a certain range, and then selects the non-faulty input. If both inputs are non-faulty, the FT selection block 11 selects a predefined input, e.g., the input from OP5. Note that LUT-based estimate block 19 is not related to the quality LUTs constructed in the characterization step described below. In many automotive systems, a LUT is used to estimate the value of a signal "A", from signals other than A. This helps in augmenting the FT of the system in case the source of signal A fails.

In most automotive systems of interest, control logic 16 is almost entirely software-based, thereby signals 13 may be immediately converted to data items provided as inputs to control software components. Moreover, many control components may be time-triggered, such that they start or resume execution at specific time instances. For example, OP4 of FIG. 1 may be configured to execute only when a predetermined duration, e.g., 5 ms, elapses from the start of execution, even if inputs are available earlier. Other operations 17 labeled as OP1, OP2, OP3, and OP5 in FIG. 1 may execute in a similar or a different manner depending on the model 10. Edges between operations denote virtual functional connection between them, which map the output trajectory of a source operation as the input trajectory for the destination operation.

Approach for Fault Tolerance Analysis

Still referring to FIG. 1, an approach is provided for automated analysis, via the host machine 15, of a given FT system, e.g., an automotive system. The approach consists of two analysis methodologies or sets of steps used in tandem for checking the resilience of an automotive system towards various logical and quality faults: (I) a static analysis step, and (II) an operations-level fault-injection and simulation step. Static analysis performs an approximate but rapid evaluation of a set of predetermined fault-scenarios. Thereafter, for each fault-scenario and input leading to a violation of calibrated FT requirements, the simulation-based validation step verifies whether the violation is spurious or not.

Operations-level models and analysis is typically addressed only at the implementation level. This requires the appropriate abstraction of implementation-level errors to the operations-level, and the modeling of relevant implementation details in a suitable operations-level model. The abstraction of various types of faults to appropriate manifestations in operations-level models is discussed below. The present methodology instead focuses on a quality-centric analysis, and facilitates reasoning about the deviation in behavior of, for example, a fault-injected automotive system, instead of reasoning about the trajectories of the automotive system signals. The simulation-based framework provides a trace of the deviation between the fault-free and fault-injected system behaviors. On the other hand, the static analysis step only reasons about the quality or amount of error of the various signals without delving into details of the actual signal trajectories.

Simulation-Based Analysis of Operational-Level Models

Still referring to FIG. 1, most analysis and synthesis steps are performed on operations-level models such as model 10 for leveraging quicker turnaround and analysis time at a higher level of granularity. One of the most important requirements of an operations-level fault-simulation framework is the modeling of various quality and logical faults at operations-level abstraction. The origin of faults typically lies in circuit-level or assignment-level details of an implementation. For example, a soft error causes a transient bit-flip in a memory cell or register, or a temperature induced shift in power supply of a sensor causes the output signal to shift. These faults are abstracted to the level of operations-level models, e.g., model 10, while still preserving the essence of the manner in which a fault affects a signal value.

One may abstract the effects of various types of faults in an operations-level model such as model 10 of FIG. 1. For example, one may abstract: (1) sensor faults leading to added noise on output and shift in output signal trajectory, e.g., noise and shift faults; (2) missing data from sensors leading to arbitrary sensor outputs or spikes in certain time-slots, e.g., example missing data from a camera; (3) software bugs and hardware errors which do not manifest themselves in every execution run can be viewed as spike faults in certain time-slots in which they are exercised. These spike faults over-approximate the defect introduced by the bug/error by producing the maximum value possible for the signal in the said time-slot; and (4) precision losses in software components are modeled as trajectory shifts. These shifts can occur due to typecasting bugs, and due to porting control software to embedded automotive platforms which may not support many high-precision and floating-point operations.

One may also abstract: (5) logical faults which are detected by appropriate components in the hardware-layer such that fault-silence can be implemented. Operations are assumed to be instrumented such that they are fault-silent in case any essential input signal indicates fault-silence; (6) clock/pulse drifts/skews leading to delay faults manifested by time-line distortion for output signals and alteration in delay associated with timers. Variations in execution delays of software tasks may also cause changes in rate of sampling and signal generation, leading to delay faults; and (7) hardware recovered soft-errors manifest as spikes, i.e., sudden and short changes on signals, such as a spike fault.

Some of the aforementioned faults do not originate in software control components of the automotive system. However, due to fault propagation, their effects are still observed on the outputs of various software control components, among others. Therefore, any analysis method should address the propagation of the aforementioned faults across different types of software, hardware, and mechanical components from plant model 18.

Figure 2A:
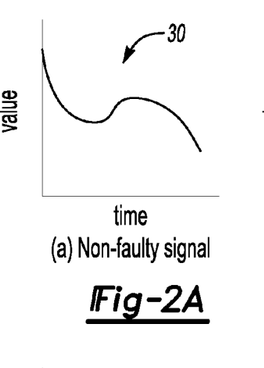
FIG. 2A is a plot of a first type of signal error that may be evaluated via the present method.
Figure 2B:
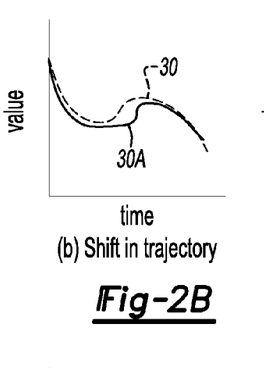
FIG. 2B is a plot of a second type of signal error that may be evaluated via the present method.
Figure 2C:
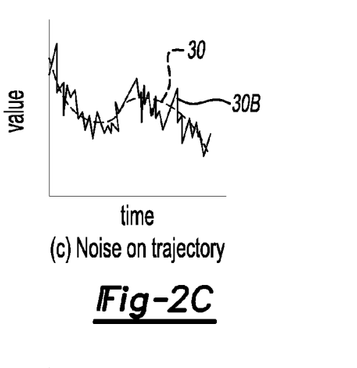
FIG. 2C is a plot of a third type of signal error that may be evaluated via the present method.

Referring to FIGS. 2A-F in turn, one may associate each type of quality degradation with an appropriate measure for denoting the extent of the quality degradation, i.e., the error. FIG. 2A represents a "clean" or non-faulty signal 30. FIG. 2B represents a shift error in the signal trajectory of signal 30, for which quality is denoted by the maximum deviation in signal value between signal 30 and signal 30A among all time instances. FIG. 2C represents signal noise, for which a quality is described by amplitude of the overlaying additive noise signal 30B, including white noise, Gaussian noise, etc.

Figure 2D:
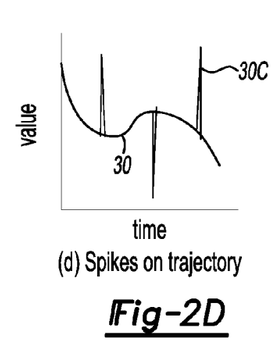
FIG. 2D is a plot of a fourth type of signal error that may be evaluated via the present method.
Figure 2E:
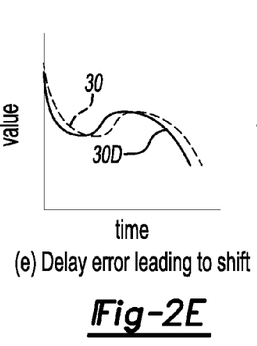
FIG. 2E is a plot of a fifth type of signal error that may be evaluated via the present method.

Continuing with FIG. 2D, spikes 30C is due to hardware recovered soft-errors, software-bugs, transient hardware errors, and/or transient sensor errors such as missing sensor data. The quality is denoted by the number of spikes 30D. The peak value of spikes 30D is bound by the upper limit of the operation-range or data-type, in case the signal is a digital data. FIG. 2E represents delay in the generation of the appropriate signal 30D, for which the measurement of quality degradation is the delay, whether positive or negative.

Figure 2F:
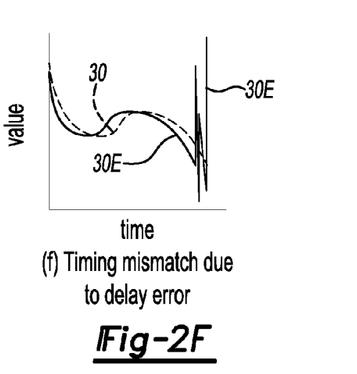
FIG. 2F is a plot of a sixth type of signal error that may be evaluated via the present method.

Often a delay fault leads to some spike or random noise introduction, as shown in FIG. 2F. This may happen if the signal trajectory is generated up to $t_{pre}$ time units by one operation (OP1) and thereafter by another (OP2), as shown in FIG. 1. For example, let OP1 complete execution in $t_{pre}-\tau$ time units due to a delay fault and let OP2 not start until $t_{pre}$ time units have elapsed. In this case, no operation generates the signal for the time duration $t_{pre}-\tau$ to $t_{pre}$, and hence the signal trajectory in this duration could be random or a set of spikes.

There are three inputs to the simulation-based fault tolerance analysis framework, namely (1) a test case, (2) a fault-scenario, and (3) FT requirement specifications. Test cases typically describe a set of typical as well as critical maneuvers or job sequences which are performed by the automotive system. Additionally, test cases may also be generated to perform directed analysis of the automotive system. Usually, the sensor inputs which come from the user are modeled by these test cases. In case only a part of the system is being tested, certain signals from the "plant", represented by plant model 18 in FIG. 1, which were generated in response to control signals from some other sub-system, are also included in the test-suite.

The second input to the simulation-based fault-injection framework is the description of the fault-scenario under which the system must be analyzed. Fault-scenarios may be described explicitly by stating a set of faults which must occur. In the case of quality faults, in addition to the information of which faults occur, the measure of quality degradation must also be stated. Hence a fault-scenario is a set of triplets of the form (location, fault-type, measure), wherein location denotes the signal which is afflicted by the fault, and wherein fault-type and measure denote the type and measure of error, respectively. Note that measure is irrelevant for logical faults. For example a fault-scenario may specify that "at most five spikes, i.e., type and measure, may be introduced by all software components".

While specifying fault-scenarios as inputs to the analysis framework, it is important to account for the correlation between various faults. Clearly, software tasks mapped to the same processor will suffer from some common faults due to the processor. Similarly, sensors from the same manufacturer usually suffer from similar faults, while a common power supply induces several correlated noise and signal shift faults in all sensors it supplies power to. These correlations must be captured in any FT analysis framework. In case the correlation between faults is described by a correlation coefficient between 0 and 1, or between 0% and 100% correlation, multiple Monte Carlo fault-simulations could be performed for the analysis, as understood in the art.

Apart from explicit fault-scenario description, another way to describe fault-scenarios is implicit description by setting a lower bound on the probability of occurrence of a set of faults which occur during one run of the system. If the probability of individual faults and correlation between faults is known, then the probability of a set of faults can be computed. A probability bound then describes all fault-scenarios for which the above computed probability is more than the bound. Such probability bounds are typically related to safety requirements of automotive system, for example from IEC Safety Integrity Levels.

It may be noted that in case of quality faults, not only the probability of occurrence of the fault, but also the probability of attaining various quality degradation measures must be provided. Indeed, the probability of a quality fault may be denoted by a function: $P_{quality}$: measure$\rightarrow$[0, 1] mapping the measure of quality degradation to the probability of occurrence of the fault, with that measure. A measure value of zero (0) denotes that the fault has not occurred. While generating test cases for directed FT analysis, generation is required not only the test case maneuver, e.g., sensor inputs, but also of the corresponding fault-scenario. Additionally, FT analysis is often performed on the difference between the "correct" control signals and the faulty signals, and not on the faulty signal alone. These issues add an additional dimension to the test case generation problem for FT analysis.

The third set of inputs to the simulation-based fault analysis framework is the set of FT requirements which must be satisfied by the system. These FT requirements form the specification, to which the system must conform to even in the presence of faults. There are various ways of specifying FT requirements. Logical and timing properties specifying the design intent of the system can be used as specification for the FT analysis step. Additionally specific properties for checking bounds on quality degradation may be specified, for example an upper bound on amount of superimposed noise. Besides this, more involved properties may be written where acceptable quality degradation is a function of time.

Given the three inputs to the FT analysis framework, the simulation-based FT mechanism consists of fault-injection, simulation of the operations-level model, and checking assertions corresponding to the FT requirement properties. A "fault-injection" operation is thus presented herein which introduces errors of different (and multiple) types on a signal. These errors correspond to the faults of each operation as per the fault-scenario to be analyzed. This operation takes as input the types of quality faults and the quality degradation measures for each different type of quality fault.

Additionally, information about logical faults is also taken as input by the "fault-injection" operation. These inputs, quantizing the quality faults and indicating whether or not a logical fault exists on a particular signal, are obtained from the particular fault-scenario being analyzed. The "fault-injection" operation then introduces quality faults and logical faults as per inputs to this operation. It may be noted that all types of quality faults cannot be introduced on every type of signal. For example, a signal generated by a software component (a data signal) which represents the variation of a floating-point data with time, cannot be afflicted by a quality fault like "noise", which is usually confined to sensors and analog components. However, such a signal may be afflicted by a "spike" fault if a software bug is invoked in one time-slot. Additionally such a signal may be afflicted by a "shift" fault in case of precision losses due to floating-to fixed-point conversions while porting to an embedded platform, or due to a typecasting bug.

Figure 3:
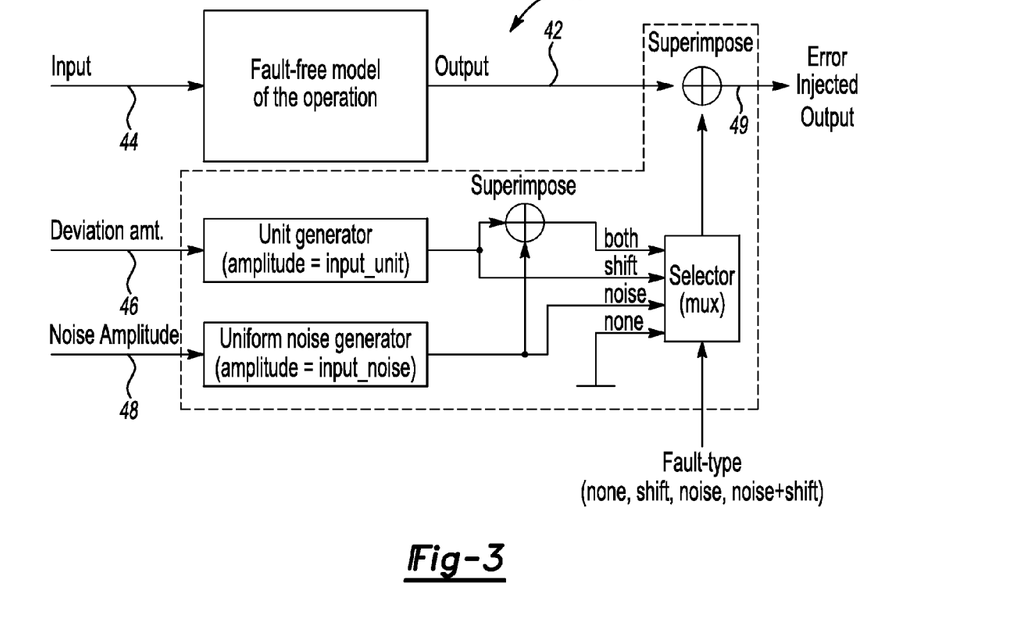
FIG. 3 is a schematic illustration of a fault-injection mechanism for introducing errors on a signal.

Referring to FIG. 3, an example fault-injection operation 40 is shown. Fault-injection operation 40 introduces noise errors and shift errors on a signal line or output 42. The inputs to this operation are the signal lines or output 42, fault-type 44, deviation amount 46, and noise amplitude 48. The input fault-type controls the type of error to be introduced on the signal, which may be either a noise, or a shift, or both, or none of the two errors. The inputs deviation amount and noise amplitude respectively state the amount of shift to be introduced and the amplitude of the noise signal to be superimposed. Hence, a designer can control the types and amount of precision errors to be introduced on the signal. The "fault-injection" operation superimposes the selected errors on the signal "output" to produce the "error-injected output" 49. This "error-injected output" 49 may subsequently be the input to some other operation, thereby propagating the injected errors.

According to one embodiment, one "fault-injection" operation is placed on each signal, thereby enabling an infrastructure of introducing faults corresponding to any user-defined fault-scenario. These "fault-injection" operations are written in the same modeling language as the operations-level model, for example Simulink. Thereafter, with test case and fault-scenarios as inputs, the model 10 of FIG. 1 is simulated using the appropriate operations-level simulation framework to enable fault simulation. Assertions on values of signals are checked using verification suites provided by the simulation framework, or by dumping and analyzing traces collected at discrete time-steps.

Figure 4:
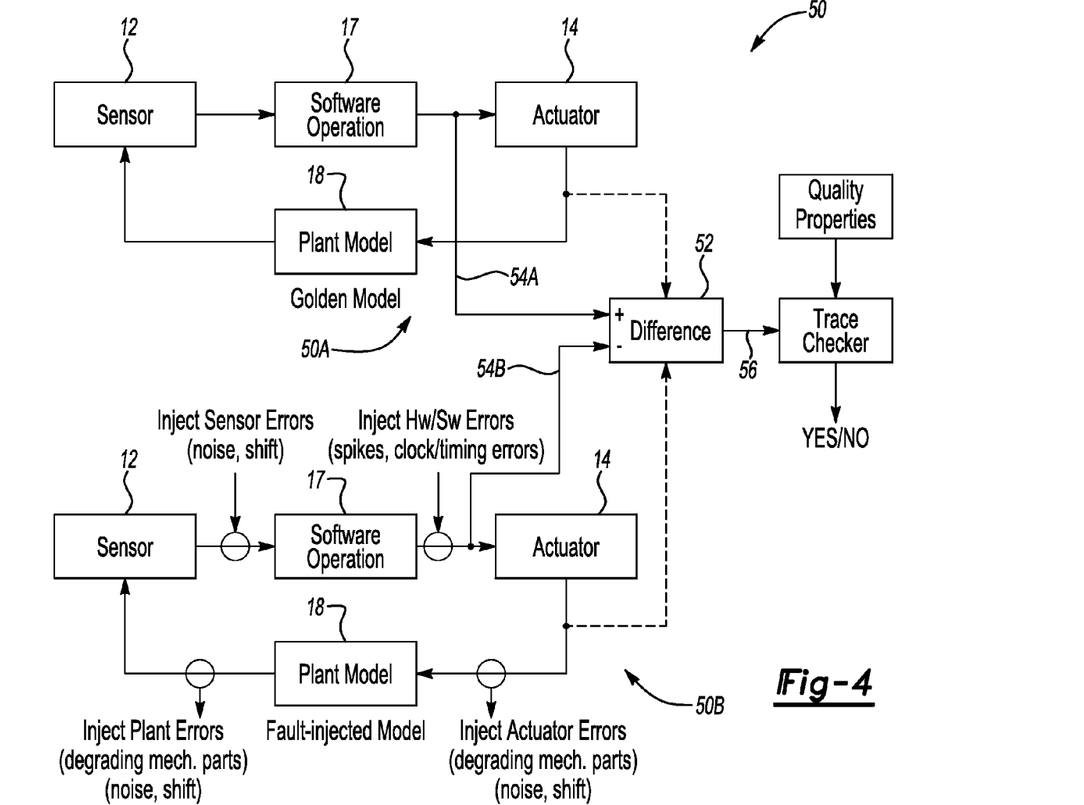
FIG. 4 is a schematic illustration of a quality centric simulation-based analysis of a system according to one embodiment.

Referring to FIG. 4, a quality-centric simulation-based analysis 50 is schematically illustrated on a simple automotive system consisting of one sensor 12, one actuator 14, and one control operation. A "golden model" 50A is shown at the top of FIG. 4, and a fault-injected model 50B is shown at the bottom. Fault-injection is performed on various signals to capture the effects of failures of various components. The difference in trajectory with respect to a fault-free model is obtained and reasoned about.

As noted above, in addition to the framework for analyzing operations-level models with fault-injections, we are interested in performing quality centric analysis. Quality-centric analysis reasons about the quality of the signals and not the actual value of the same. Hence, we are interested in the deviation of trajectory of signals produced by a faulty system, from those produced by a fault-free system. For this a simulation setup may be used wherein the native/golden model 50A and fault-injected model 50B are simulated simultaneously, and the difference between signals 54A, 54B is obtained by a difference operation 52.

This difference 56 denotes the deviation of the faulty signal 54B from the non-faulty signal 54A. Assertions reasoning about the quality of the signal, i.e., the deviation from fault-free behavior, are then checked on the trace obtained as output of the difference operation 52. The definition of deviation of a faulty signal and the type of difference operation 52 used depend on the type of fault being analyzed. The most widely used difference operation has the semantics of the Simulink "Subtract" operation, and is implemented by it in operations-level models.

The semantics may be illustrated by an example pair of discretized signals given as inputs to the "Difference" operation, such that they have the same time-step (6) and the signal amplitudes in time-step $t_i$ are $v_i^1$ and $v_i^2$, respectively. The output of this operation is a trajectory having time-step 6 and signal amplitude at each time step, $t_i$, is the difference in amplitudes of the two input signals in step $t_i$ ($v_i^1 - v_i^2$) This type of difference operation is useful in reasoning about shift, noise (used with a column filter), and spike errors. Another type of difference operation performs analysis of signal deviations in the frequency domain, in order to reason about delay faults. Several other types of difference operations may also be used depending upon the scope and requirements of the analysis, without departing from the intended scope of the invention.

An important component of any simulation-based setup, whether quality-centric or otherwise, is a method for evaluating the coverage of the simulation-based validation for the provided test-suite. Traditional notions of coverage based on checking visited states or code coverage, transitions or branch coverage, and variable values, may not be sufficient for fault tolerance analysis. Often the aforementioned coverage metrics provide a rough idea of tested execution scenarios, both fault-free and fault-recovery. However, these metrics are insufficient in estimating the actual residual simulation effort remaining, as many tested execution- and fault-scenarios may be equivalent modulo the analyzed fault tolerance requirements.

Quality degradations are described by triples containing the type of fault, magnitude of fault, and location of fault. One fault-simulation run is associated with a set of quality degradation triples, which are witnessed at different signals (locations) during fault-simulation. There is a causal relation between these triples (for example, given an operation with input signal I and output signal O, error A on signal O is caused due to error B on signal I) due to the causal relationship between different operations in the operations-level model. One may define coverage as the number of such causal relationships which are present between quality degradation triples witnessed during fault-simulation. Other similar techniques may also be used, for example, counting the number of fault-triples witnessed is another measure of coverage. Several triples may also be considered equivalent, if they have similar magnitudes of error for a given fault type and location, or on the basis of other criteria. In such cases the causal relations between triples is appropriately modified.

Static Analysis of Operational-Level Models

Figure 5A:
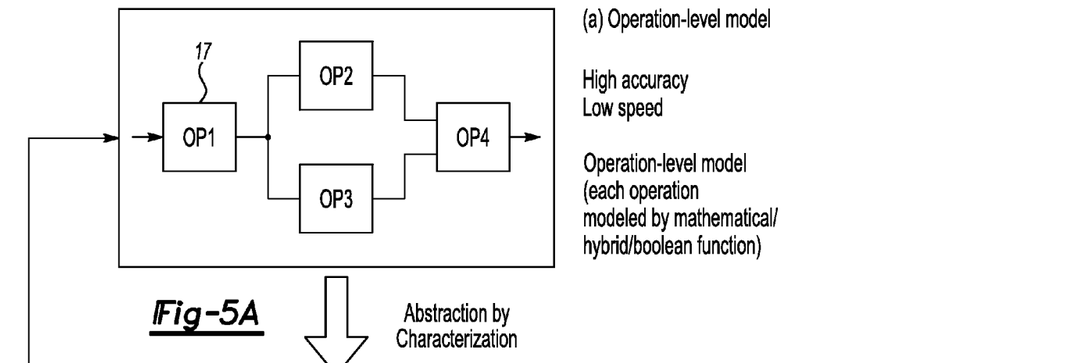
FIG. 5A is a schematic illustration of a first step in a quality-centric static analysis framework.
Figure 5B:
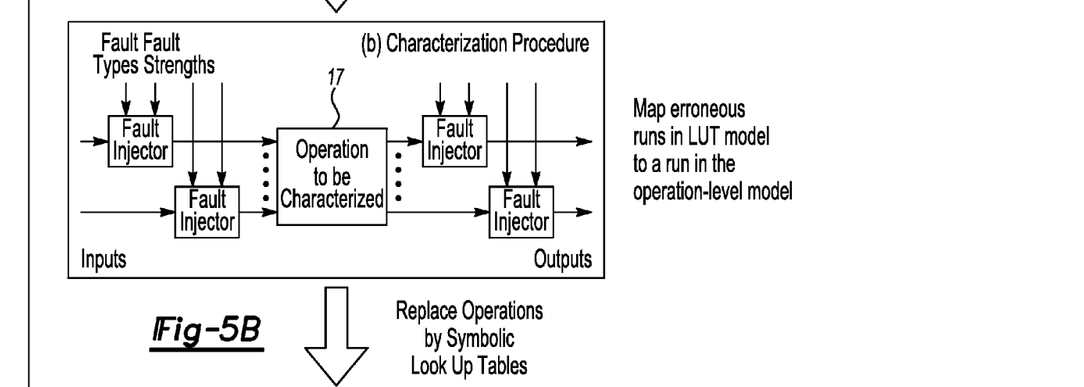
FIG. 5B is a schematic illustration of a second step in a quality-centric static analysis framework.
Figure 5C:
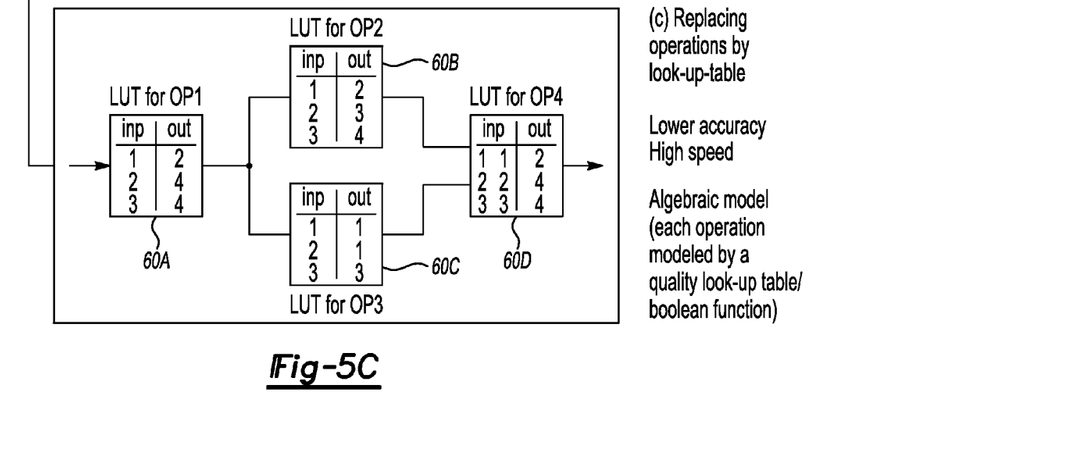
FIG. 5C is a schematic illustration of a third step in a quality-centric static analysis framework.

Referring to FIGS. 5A-C, an important ingredient of the proposed fault-tolerant system design approach is a static analysis method which quickly analyzes all fault scenarios and test cases modulo a user specified level of abstraction. This static analysis method is a quality-centric analysis method as it reasons about the quality degradation of signals instead of the actual signal trajectory. The steps of the analysis method are summarized in FIGS. 5A-C.

The static analysis method proceeds in two steps, namely a characterization step (FIG. 5B) and a symbolic analysis step (FIG. 5C). In the characterization step of FIG. 5B, simulation is performed on individual operations, e.g., OP1-OP4 of FIG. 5A, with different test cases and with varying amount of quality error of the input signals, while recording the quality degradation of the output signals. Additional characterizing simulations are performed by introducing quality errors on the output signals with varying quality errors being introduced on the input signal.

Both the quality degradations of the input and output signals are quantized and codified by symbolic lookup tables 60A-D, i.e., LUTs, as shown in FIG. 5C. This enables the recorded input versus output qualities to be represented as a LUT. Hence, after characterization, the behavior of each operation is abstracted by a LUT 60A-D, which only reasons about the quantized input-quality and output-quality of the operation from FIG. 5A.

Figure 6A:
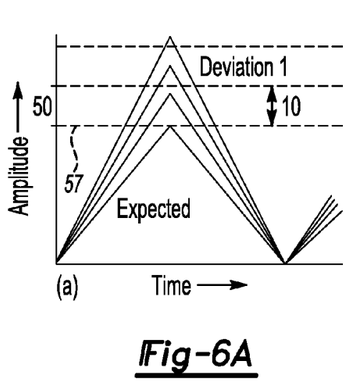
FIG. 6A is an input signal versus time plot.
Figure 6B:
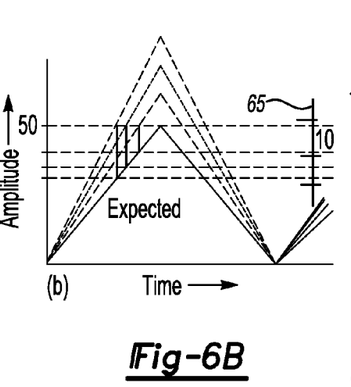
FIG. 6B is an output signal versus time plot.
Figure 6C:
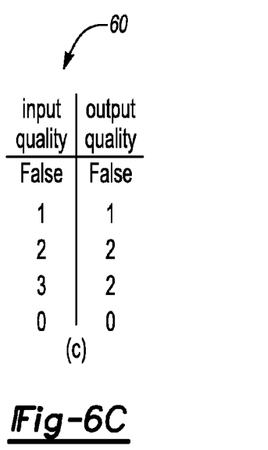
FIG. 6C is a lookup table usable with the present methodology.

Referring to FIGS. 6A-C, an example quality LUT for shift errors, denoting the output quality for various input qualities for shift in trajectory, for a triangular wave input (FIGS. 6A and 6B, respectively) to a saturation operation, is shown in FIG. 6C. A saturation operation truncates the input signal to a user specified upper limit 57 of FIG. 6A. In this example, consider a saturation operation implemented as a software component. For this software implementation, a trajectory may be represented by an appropriately discretized sequence of fixed/floating-point numbers, each representing the signal value (amplitude) at certain discrete time-slots.

Consider the expected (golden) input signal which is a triangular trajectory with amplitude 57 of FIG. 6A, while erroneous input signals are triangular trajectories with different amplitudes greater than the level of amplitude 57. Therefore, the erroneous input signals have a shift in trajectory from the golden input, which is characterized by the maximum difference between the amplitudes of the erroneous and golden signals. One may use various symbols to codify quantized shifts in amplitudes, in order to denote the quality of input signals. If the amplitude shift is between 0 and 10, for example, the symbol "1" may be used to denote this. Similarly, "2" may be used to denote a shift between 10 and 20, "3" to denote a shift between 20 and 30), etc.

For example, the input signal "Deviation 1" in FIG. 6A has an amplitude shift between 20 and 30, and hence is characterized by the symbol "3". For this saturation-block example, the golden output is the same as the input, a triangular wave with amplitude 57. However, erroneous input signals, which have amplitude greater than the level of amplitude 57, get truncated by the saturation operation. In this case, the maximum shifts in amplitudes for the erroneous output signals are illustrated in FIG. 6B by vertical lines 65. By using symbols to denote these shifts, as done with input signals, the quality of various erroneous output trajectories is obtained. For example, the output signal corresponding to the input signal "Deviation 1" (quality "3") has a shift in amplitude from the golden output between 10 and 20, and hence has a quality of "2".

Therefore, for an input quality of "3", the output signal quality is "2". The special symbol "0" denotes that there is no shift from the golden input/output. The lookup table 60 of FIG. 6C contains a mapping from input to output qualities, for all input qualities corresponding to a user defined quantization of the amplitude shift. For the example in FIGS. 6A-C, the quality symbols are selected on the basis of uniform quantization of the amplitude shift between the golden and erroneous signals. This uniform quantization consisted of dividing the amplitude shift into intervals of size 10, for example the interval [10, 20].

However, in general, uniform quantization may not be the basis of constructing a LUT. For example, amplitude shifts may be quantized into five levels between [0, 10] and only two levels between [10, 20]. These non-uniform quantization levels may be guided by the requirements of the fault tolerance analysis. Another important aspect of quality-centric analysis stems from the fact that the output signal quality of an operation depends not only on the input signal quality, but also on the type of the signal (for the current example a "triangular wave") and the state of the operation (for example various configurations of a reconfigurable operation).

Hence, an additional attribute called the feature is used to distinguish different types of input signals and operation behaviors. For example, "triangular wave" is an input feature for the example in FIGS. 6A-C. The quality LUT for this type of input signal is different from that of some other type of signal, for example a square wave. The LUTs therefore store input-output qualities for different features. Although several simulation runs may have to be performed for characterizing single operation blocks, this characterization step is a one-time job, and the LUT obtained can be reused across different designs. Once the characterization step is completed, quality-centric analysis can be performed by a series of lookup operations for a given fault-scenario and test case.

Figure 7:
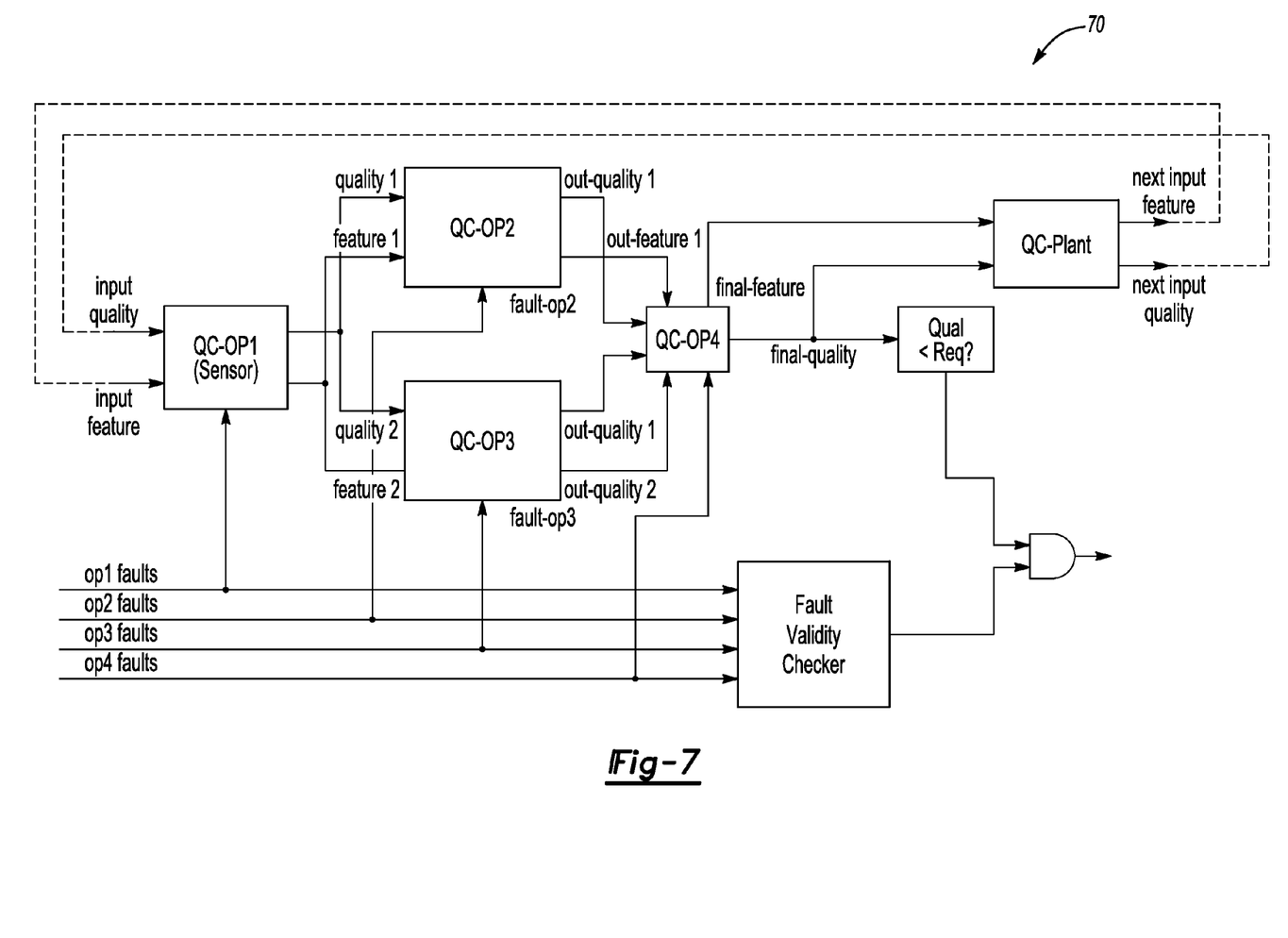
FIG. 7 is a schematic illustration of a Boolean circuit for the quality analysis of the operational-level model of FIGS. 5A-C.

Referring to FIG. 7, by partitioning the quality degradation (deviation from expected behavior) into intervals, each LUT entry can be codified by a symbol denoting the interval to which it belongs. Therefore, after quantization, a LUT maps symbolic inputs to symbolic output entries, and is amenable to algebraic analysis. By encoding the symbols in Boolean logic, each lookup table can be modeled using a Boolean circuit 70. Since an operations-level model consists of operations and connections between them, the quality behavior of a complete operations-level model can be represented as Boolean circuit 70 consisting of sub-circuits representing LUTs, and appropriate connections between them.

All fault-scenarios and test cases, at the granularity of quantization, can be checked by finding a satisfiability, i.e., SAT-solving for a Boolean circuit 70 modeling the quality behavior of the operations-level model. Aside from static SAT-based analysis, Satisfiability Modulo Theory (SMT-solving) or a simulation-based method, as understood in the art, can also be employed once each operation is characterized and represented by a quality LUT. One way to perform this analysis within the framework of operations-level models, as provided by Simulink, is to replace operations by quality LUTs and subsequently perform a simulation of such a model.

Quantization reduces the accuracy of analysis, and hence an erroneous run found in the Boolean analysis setup must be checked in the operations-level model. For this, the fault-scenario (including the measure of each fault) and test case causing the erroneous run must be obtained. These entities are inputs to the Boolean circuit modeling the quality behavior and are provided by the SAT-solver for the satisfiable instance. Hence the erroneous run, detected by the SAT analysis, can be reproduced in the operations-level simulation setup.

Still referring to FIG. 7, an issue to address for this framework is providing a proof that quantization always over approximates the error. In this case, if no erroneous runs can be found by the static analysis, there is a guarantee that there is no erroneous run in the operations-level model. In circuit 70 of FIG. 7, the lookup tables of the operations OP1, OP2, OP3, and OP4 of FIG. 5A are represented as sub-circuits QC-OP1, QC-OP2, QC-OP3, and QC-OP4. The characterized model of the plant is represented as the circuit QC-PLANT. The complete circuit has six inputs namely input-quality, input-feature, op1-faults, op2-faults, op3-faults, and op4-faults.

The signals input-quality and input-feature are the quality (a symbol) of the input to the sensor, and the test case being analyzed respectively. The initial inputs to the sensors are assumed to be pure, and hence, the quality of each input signal is a pre-assigned constant "0". The different types of possible input signal trajectories corresponding to different test cases are assumed to be known a priori, and therefore "input feature" may be set to any one of a finite set of symbols, where each symbol denotes one type of signal. For example a could denote a sine wave of amplitude "1" and β could denote a cosine wave of amplitude "1", while γ could denote a sine wave of amplitude "2".

In most designs, like the one discussed herein and shown in FIGS. 5A and 7, there is a feedback loop from the outputs of the plant to the inputs of the sensors. This feedback loop is removed for the quality-centric analysis, since quality is defined over the complete simulation window (time duration for which simulation is performed) and a lookup table based analysis without any feedback covers analysis for the simulation window. The fault-scenario to be analyzed is an input to this circuit, and the set of faults for each operation is assigned through inputs op1-faults, op2-faults, op3-faults, and op4-faults. These inputs guide the types and strengths of errors manifested by operations OP1, OP2, OP3, and OP4 respectively.

If several operations have been mapped to a single processor, then there is a correlation between the types of faults experienced by each operation. This may be modeled by additional Boolean constraints. Aside from circuit blocks corresponding to operations of the automotive system, there are two additional circuit blocks which ensure that any low quality output for a reasonably probable fault scenario, is notified. The first block checks whether the final output quality is less than a user specified limit (output of block is True). The second block (FAULT-VALIDITY-CHECKER) checks if the fault-scenario being analyzed is a fault-scenario of interest to the designer.

For example, consider an analysis setup where fault-scenarios are specified implicitly by imposing a bound on expected probability of failure of the automotive system (from Safety Integrity Levels), and specifying the probability of occurrence of different faults, and assuming no correlation between faults. In this case a FAULT-VALIDITY-CHECKER may be employed to check if the probability of occurrence of the fault scenario is greater than the desired fault occurrence probability of the system ($P_{system}$). For constructing this example FAULT-VALIDITY-CHECKER block, assuming no correlation between faults, first the smallest probability of a fault occurrence for any operation is obtained ($p_{smallest}$). Then, for each failure type f, $count_f = \lfloor Sp_f/p_{smallest} \rfloor$ is computed, where S>1 is a scaling factor. Thereafter, for each evaluation of the circuit, the "Fault Validity Checker" computes the sum of all $count_f$ for all enabled faults f Then it checks if this sum is less than an upper limit:

$\lceil SP_{system}/p_{smallest} \rceil (\Sigma_{f is enabled} count_f < \lceil SP_{system}/p_{smallest} \rceil$. If this is the case, then "Fault Validity Checker" gives a True output indicating that the fault-scenario is admissible. It may be noted that while $\lfloor SP_f/p_{smallest} \rfloor$ underestimates the value of SPf/psmallest, over-approximation of SPsystem/psmallest is provided by $\lceil SP_{system}/p_{smallest} \rceil$. This ensures that this part of the analysis performed by the aforementioned method is over-approximated.

Synthesis of Fault-Tolerant Automotive Systems

The abstraction of quality behavior of an operation as a symbolic lookup table presents several opportunities to devise synthesis algorithms for fault-tolerant automotive systems. As explained above, the quality behavior of individual operations can be modeled as circuits, as can mechanisms for reasoning about the probability of occurrence of fault-scenarios. This allows us to apply available circuit synthesis methods to build circuits by combining sub-circuits corresponding to different operations (along with the sub-circuit for reasoning about probability of occurrence of fault-scenarios). If a circuit with the desired set of output qualities can be synthesized, then replacing quality-abstracting lookup table sub-circuits by the corresponding operations in the topology inferred by the synthesis mechanism yields the function-level model of the desired fault-tolerant automotive system.

The method set forth above allows for the use of either or both of a LUT-based simulation and a discrete LUT-based static analysis method to detect a counterexample, and for reproducing the counterexample in the FT specification 20 of FIG. 1. The counterexample describes a set of fault values in different components of the system, with the fault values causing the system to behave in such a manner as to violate the FT requirements set forth in the FT specification 20. Using the LUT-based static analysis method could include using model checking, Boolean satisfiability solving, Satisfiability Modulo Theory solving, search algorithms, etc.

As used herein, the term "counterexample", in the FT context, is a set of values of faults in different components, e.g., amplitude of noise, shift, and/or the number of spikes at the sensors 12 of FIG. 1, number of spikes at the various software blocks in the model 10 of FIG. 1, etc., which causes the evaluated system to behave in a manner which violates the FT requirements captured as a functional specification. For example, if there is a noise level of 5% on the output of sensor 1 in FIG. 1, and there is 1% shift on the output of OP5 in the same figure, then the final output has a shift of 12%. If the functional specification of FT requirements were the triplet <final output, 10%, shift>, meaning that the amplitude of shift on "final output" should be less than 10%, then the 12% shift violates this requirement. The counterexample here is "noise of 5% on the output of sensor 1 and 1% shift on the output of OP5", the condition which drives the system to a faulty behavior as specified by the FT requirements. While reproducing the counter-examples in a native model, the counter-examples may be used to improve the accuracy of the behavioral abstraction of operations-level models to discrete LUTs.

While the best modes for carrying out the invention have been described in detail, those familiar with the art to which this invention relates will recognize various alternative designs and embodiments for practicing the invention within the scope of the appended claims.

The invention claimed is:

1. A method for analyzing the fault tolerance (FT) capability of a system, the method comprising:
   recording, on tangible media that is accessible by a host machine, a set of calibrated FT requirements that must be satisfied by the system;
   using the host machine to generate an operations-level model of the system, wherein the operations-level model includes a mathematical model of the dynamics of the system and control logic for the system in the form of software operations, wherein each of the software operations includes input ports for receiving input signals and output ports for transmitting output signals;
   introducing a set of signal errors to the model in the form of at least one of a noise error, a trajectory shift error, a spike error, and a time-line distortion error;
   automatically characterizing a behavior of a set of components of the system, as represented by the model, as a discrete lookup table (LUT), wherein the LUT codifies the quality degradation of the input and output signals; and
   using the host machine to analyze the FT capability of the system via the discrete LUT with respect to the calibrated FT requirements from the functional specification.

2. The method of claim 1, further comprising:
   recording an alternate design scenario for the system on the tangible media; and
   automatically analyzing the alternate design scenario via the host machine using the LUT and the functional specification.

3. The method of claim 1, further comprising:
   checking via the host machine, as a first set of steps, all possible combinations of inputs and fault-scenarios in the functional specification; and
   checking via the host machine, as a second set of steps, an FT status of the system under a set of calibrated test cases and fault-scenarios using the LUT.

4. The method of claim 1, further comprising:
   determining the presence of a violation of the FT requirements during the first set of steps; and
   reproducing a set of system behavior leading to the violation in a second model.

5. The method of claim 1, further comprising:
   storing the characterized quality behavior of the components in the LUT; and
   processing the LUT using the host machine to determine the quality behavior of the system.

6. The method of claim 1, further comprising:
   using at least one of a LUT-based simulation and a discrete LUT-based static analysis method to detect a counterexample; and
   automatically reproducing the counterexample in the FT specification;
   wherein the counterexample describes a set of fault values in different components of the set of components, with the fault values causing the system to behave in such a manner as to violate the FT requirements.

7. The method of claim 6, including using the LUT-based static analysis method, wherein the using LUT-based static analysis method includes using at least one of: model checking, Boolean satisfiability solving, Satisfiability Modulo Theory solving, and search algorithms.

8. The method of claim 1, further comprising: inputting each of a test case, a fault-scenario, and the fault tolerance requirement specifications into the host machine, wherein:
   the fault-scenario is a set of triplets of the form of location, fault-type, and measure;
   the location denotes a signal afflicted by the fault; and
   the fault-type and measure denote the type and measure of error, respectively.

9. The method of claim 1, wherein the model includes a FT selection block, the method further comprising using the FT selection block to detect and select a non-faulty input, and to transfer the non-faulty input to an output of the FT selection block.

10. An apparatus adapted for analyzing the fault tolerance (FT) capabilities of a system, the apparatus comprising:
    a host machine; and
    tangible media accessible by the host machine, and on which is recorded a functional specification defining a formalized set of fault tolerance (FT) requirements which the system must satisfy even in the presence of faults;
    wherein the host machine is configured for:
    generating an operations-level model of the system, including generating a mathematical model of the dynamics of components of the system and control logic in the form of software operations, with each of the software operations having input ports for receiving input signals and output ports for transmitting output signals;
    introducing a set of signal errors to the model in the form of at least one of a noise error, a trajectory shift error, a spike error, and a time-line distortion error;
    characterizing the behavior of a set of components of the model in response to the set of signal errors as a discrete lookup table (LUT), wherein the LUT codifies the quality degradation of the input and output signals; and
    analyzing the FT capability of the system using the discrete LUT with respect to the functional specification.

11. The apparatus of claim 10, further comprising an alternate design scenario recorded on the tangible media and accessible by the host machine, wherein the host machine is adapted for automatically analyzing the alternate scenario using the LUT and the functional specification.

12. The apparatus of claim 10, wherein the host machine is configured for:
    checking, as a first set of steps, all possible combinations of inputs and fault-scenarios in the functional specification; and
    checking, as a second set of steps, an FT status of the system under a set of calibrated test cases and fault-scenarios using the LUTs.

13. The apparatus of claim 10, wherein the host machine is configured for:
    determining the presence of a violation of the FT requirements during the first set of steps; and reproducing a set of system behavior leading to the violation in a native operations-level model.

14. The apparatus of claim 10, wherein the host machine is configured for:
- characterizing the quality behavior of individual electronic software and mechanical components of the system;
- storing the characterized quality behavior in at least one of the LUTs; and
- processing the stored information to determine the quality behavior of the system.

15. The apparatus of claim 10, wherein the host machine is configured for:
- using at least one of a LUT-based simulation and a discrete LUT-based static analysis method to detect a counterexample; and
- reproducing the counterexample in the operations-level model;
- wherein the counterexample describes a set of fault values in different components of the system, the fault values causing the system to behave in such a manner as to violate the FT requirements.

16. The apparatus of claim 15, wherein the host machine is adapted for using the LUT-based static analysis method, and the LUT-based static analysis method includes at least one of: model checking, Boolean satisfiability solving, Satisfiability Modulo Theory solving, and search algorithms.

17. The apparatus of claim 16, wherein the host machine is adapted for recording, on the tangible media, each of: a test case, a fault-scenario, and the FT requirement specifications, and wherein:
- the fault-scenario is a set of triplets of the form of location, fault-type, and measure;
- the location denotes a signal afflicted by the fault; and
- the fault-type and measure denote the type and measure of error, respectively.

* * * * *